United States Patent
Kamiya

(10) Patent No.: US 9,973,683 B2
(45) Date of Patent: May 15, 2018

(54) FOCUS CONTROL APPARATUS, FOCUS CONTROL METHOD, CAMERA APPARATUS AND FOCUS CONTROL METHOD IN CAMERA APPARATUS

(71) Applicant: Sony Corporation, Tokyo (JP)

(72) Inventor: Koji Kamiya, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days. days.

(21) Appl. No.: 15/445,436

(22) Filed: Feb. 28, 2017

(65) Prior Publication Data
US 2017/0171461 A1    Jun. 15, 2017

Related U.S. Application Data

(63) Continuation of application No. 14/585,719, filed on Dec. 30, 2014, now Pat. No. 9,621,784.

(30) Foreign Application Priority Data

Jan. 20, 2014    (JP) .................. 2014-007468

(51) Int. Cl.
*H04N 5/232* (2006.01)
*G02B 7/28* (2006.01)

(52) U.S. Cl.
CPC ........... *H04N 5/23212* (2013.01); *G02B 7/28* (2013.01); *H04N 5/23216* (2013.01); *H04N 5/23293* (2013.01); *H04N 2201/0098* (2013.01)

(58) Field of Classification Search
None
See application file for complete search history.

(56) References Cited

U.S. PATENT DOCUMENTS

| | | | |
|---|---|---|---|
| 6,683,652 B1 | 1/2004 | Ohkawara | |
| 2005/0134719 A1 | 6/2005 | Beck | |
| 2005/0275744 A1 | 12/2005 | Yasuda | |
| 2015/0015728 A1* | 1/2015 | Miyazawa | H04N 5/23296 348/208.4 |
| 2015/0109479 A1 | 4/2015 | Kimoto | |

FOREIGN PATENT DOCUMENTS

| | | |
|---|---|---|
| JP | 11-220653 | 8/1999 |
| JP | 2002-209124 | 7/2002 |
| JP | 2012-244346 | 12/2012 |

OTHER PUBLICATIONS

Office Action dated Sep. 5, 2017 in Japanese Patent Application No. 2014-007468.

* cited by examiner

*Primary Examiner* — James Hannett
(74) *Attorney, Agent, or Firm* — Oblon, McClelland, Maier & Neustadt, L.L.P.

(57) ABSTRACT

There is provided a focus control apparatus including: a first adjustment unit configured to adjust a focus distance; a second adjustment unit configured to adjust an addition amount of the focus distance adjusted with the first adjustment unit; and a focus control unit configured to control a focus based on the focus distance adjusted with the first adjustment unit and the addition amount adjusted with the second adjustment unit. Also provided are a focus control method, a camera apparatus and a focus control method in the camera apparatus.

17 Claims, 4 Drawing Sheets

FOCUS CONTROL APPARATUS, FOCUS CONTROL METHOD, CAMERA APPARATUS AND FOCUS CONTROL METHOD IN CAMERA APPARATUS

CROSS REFERENCE TO RELATED APPLICATIONS

This application is a continuation of application Ser. No. 14/585,719, filed on Dec. 30, 2014, which claims priority to Japanese Application JP 2014-007468, filed in Japan on Jan. 20, 2014, the entire contents of each of which are incorporated by reference.

BACKGROUND

The present technology relates to a focus control apparatus, a focus control method, a camera apparatus and a focus control method in the camera apparatus. More particularly, the present technology relates to a focus control apparatus etc. that adjust a focus distance using a focus demand, for example.

SUMMARY

In a cinema camera operation, there is a dedicated focus operator mainly adjusting a focus as well as a camera operator doing a camera work. This framework is called as a follow focus. In a broadcasting operation including a live show, the camera operator should do a camera work and a basic focus work at the same time.

In the related art, a high-definition camera such as 4K is known (see Japanese Patent Application Laid-open No. 2012-244411, for example). As a captured image has a much higher definition, an accuracy for a focus distance adjustment has been highly demanded. The camera operator operates based on a video picture in a view finder. A screen size is limited. Therefore, the camera operator focuses in detail with difficulty while doing a camera frame work.

In addition, as a lens for 35 mm size image sensor has a depth field shallower than a lens for ⅔ inch size image sensor, a wide subject cannot be focused. In other words, the screen has in-focused and out-of focus areas. When a will of the camera operation is mismatched with a motive of the director about a focus point within the screen, the subject to be intended is not focused.

In view of the circumstances as described above, there is a need for providing a good focus control.

According to an embodiment of the present technology, there is provided a focus control apparatus, including:

a first adjustment unit configured to adjust a focus distance;

a second adjustment unit configured to adjust an addition amount of the focus distance adjusted with the first adjustment unit; and a focus control unit configured to control a focus based on the focus distance adjusted with the first adjustment unit and the addition amount adjusted with the second adjustment unit.

According to an embodiment of the present technology, the first adjustment unit adjusts the focus distance.

The second adjustment unit adjusts an addition amount of the focus distance adjusted with the first adjustment unit. The focus control unit controls a focus based on the focus distance adjusted with the first adjustment unit and the addition amount adjusted with the second adjustment unit.

According to an embodiment of the present technology, the focus is controlled based on the focus distance adjusted with the first adjustment unit and the addition amount adjusted with the second adjustment unit. A focus status adjusted with the first adjustment unit can be finely adjusted with the second adjustment unit.

According to an embodiment of the present technology, the focus control unit may use an absolute value of the addition amount adjusted with the second adjustment unit by reducing the absolute value of the addition amount depending on a change amount of the focus distance adjusted with the first adjustment unit. In this case, when a status of capturing an image is changed and the focus distance adjusted with the first adjustment unit is greatly changed, the absolute value of the addition amount adjusted with the second adjustment unit will be automatically reduced. Therefore, it is possible to automatically lessen the effect of the addition amount.

According to an embodiment of the present technology, the focus control apparatus may further include a display control unit configured to display a status of the addition amount used in the focus control unit. In this case, the camera operator can easily know the current status of the addition amount.

According to an embodiment of the present technology, the first adjustment unit may be a focus demand connected to the lens apparatus, and the second adjustment unit may be a follow focus controller connected to a camera control unit. In this case, the focus distance adjusted with the focus demand by the camera operator can be finely adjusted with the follow focus controller by the director.

In this case, the focus control apparatus may further includes a display control unit configured to display a screen area where the addition amount is adjusted with the follow focus controller on a view finder based on screen area information transmitted from the camera control unit. For example, the camera control unit may have a cutout function, and the screen area where the addition amount is adjusted may be a cutout area. This allows the camera operator to easily know the screen area where the addition amount is adjusted.

According to another embodiment of the present technology, there is provided a camera apparatus, including:

a focus adjustment value generation unit configured to generate a focus adjustment value from a focus distance adjusted with a first adjustment unit and an addition amount adjusted with a second adjustment unit to the focus distance adjusted with the first adjustment unit; and a focus control unit configured to control a focus based on the focus adjustment value generated in the focus adjustment value generation unit.

According to an embodiment of the present technology, the focus adjustment value is generated from the focus distance adjusted with the first adjustment unit and the addition amount adjusted with a second adjustment unit to the focus distance adjusted with the first adjustment unit. For example, the first adjustment unit may be a focus demand connected to the lens apparatus, and the second adjustment unit may be a follow focus controller connected to a camera control unit. The focus control unit controls the focus based on the focus adjustment value generated in the focus adjustment value generation unit.

According to an embodiment of the present technology, the focus is controlled based on the focus distance adjusted with the first adjustment unit and the addition amount adjusted with the second adjustment unit, whereby the focus status adjusted with first adjustment unit can be finely adjusted with the second adjustment unit.

According to an embodiment of the present technology, the focus adjustment value generation unit may use an absolute value of the addition amount adjusted with the second adjustment unit by reducing the absolute value of the addition amount depending on a change amount of the focus distance adjusted with the first adjustment unit. In this case, when a status of capturing an image is changed and the focus distance adjusted with the first adjustment unit is greatly changed, the absolute value of the addition amount adjusted with the second adjustment unit will be automatically reduced. Therefore, it is possible to automatically lessen the effect of the addition amount.

According to an embodiment of the present technology, the camera apparatus may further includes a display control unit configured to display a status of the addition amount in the focus adjustment value generated in the focus adjustment value generation unit on a view finder. In this case, the camera operator can easily the current status of the addition amount.

According to an embodiment of the present technology, the camera apparatus may further includes a display control unit configured to display a screen area where the addition amount is adjusted with the follow focus controller on a view finder based on screen area information transmitted from the camera control unit. In this case, the camera operator can easily know the focus adjustment position in the follow focus controller. Accordingly, a focusing area can be easily shared by the camera operator and a director.

According to an embodiment of the present technology, the focus can be controlled successfully. Advantages described in the specification are only illustrative and are not limited thereto, and additional advantages may be provided.

These and other objects, features and advantages of the present technology will become more apparent in light of the following detailed description of best mode embodiments thereof, as illustrated in the accompanying drawings.

DETAILED DESCRIPTION OF EMBODIMENTS

Hereinafter, an embodiment of the present technology will be described with reference to the drawings.

Figure 1:
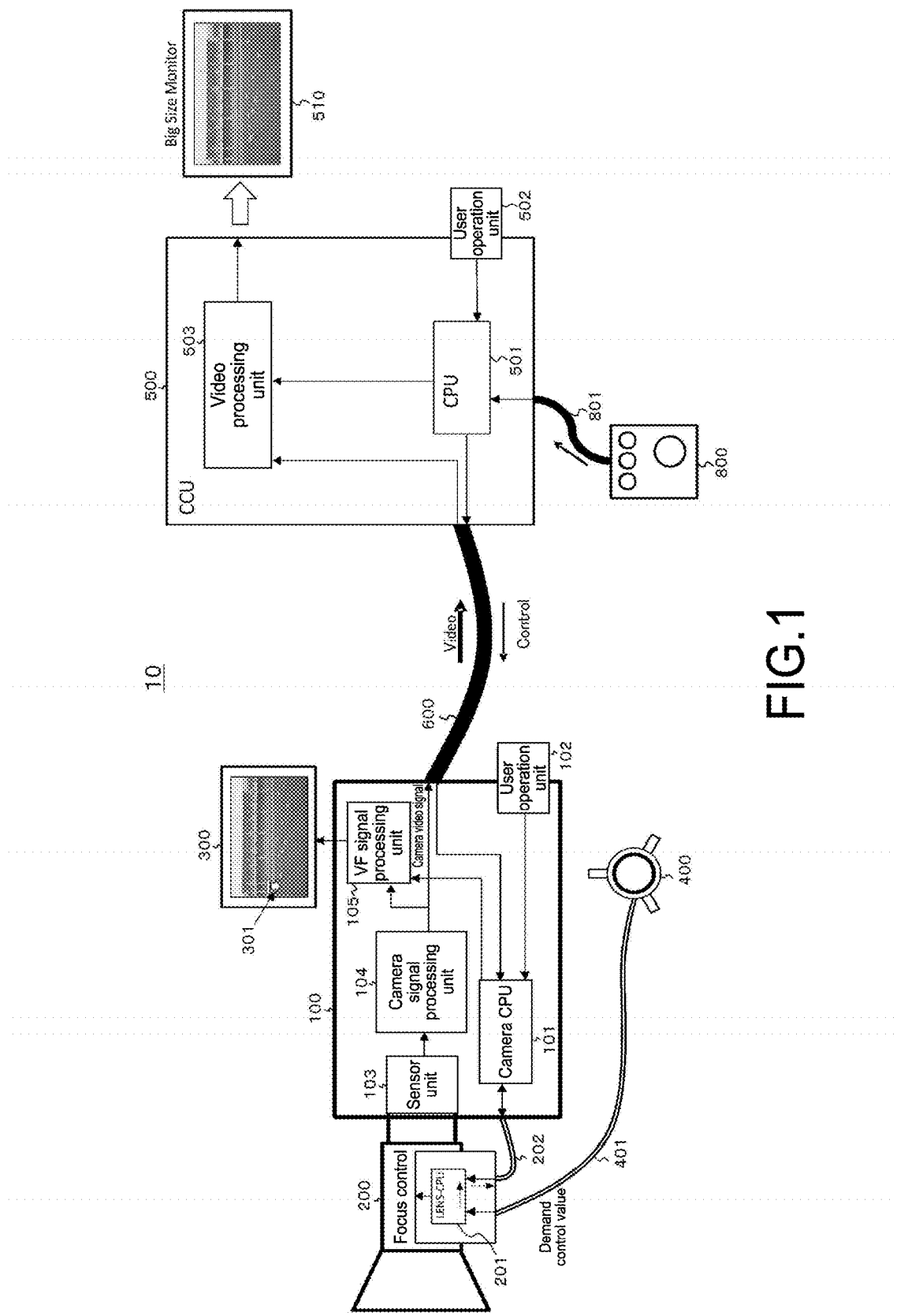
FIG. 1 is a block diagram showing a configuration embodiment of a camera system according to a first embodiment of the present technology.

The embodiments of the present technology will be described in the following order.
1. First Embodiment
2. Second Embodiment
3. Alternative Embodiment
<1. First Embodiment>
[Configuration Embodiment of Camera System]
FIG. 1 shows a configuration embodiment of a camera system 10 as a first embodiment. The camera system 10 is composed of a camera apparatus 100 and a camera control unit (CCU) 500 connected to the camera apparatus 100 via a cable 600.

To the camera apparatus 100, a lens apparatus 200 and a view finder 300 are connected. The lens apparatus 200 is mounted to a lens mount unit at a front of the camera apparatus 100. The lens apparatus 200 is configured to adjust the focus by a focus demand (focus controller) 400 as well as by a follow focus controller 800 from a CCU 500 side.

The lens apparatus 200 includes a lens CPU 201 controlling operations of the respective units. The lens CPU 201 controls the focus based on a focus adjustment signal transmitted through a cable 202 from the CPU 101 of the camera apparatus 100. In this case, the camera CPU 101 generates a focus adjustment value from a focus distance adjusted with the focus demand 400 and an addition amount adjusted with the follow focus controller 800 at the CCU 500 side.

In this case, the camera CPU 101 uses the absolute value of the addition amount adjusted with the follow focus controller 800 by reducing the absolute value of the addition amount depending on a change amount of the focus distance adjusted with the focus demand 400. A specific generation embodiment of the focus adjustment value in the camera CPU 101 will be described later.

The camera apparatus 100 includes the camera CPU 101, a user operation unit 102, a sensor unit 103, a camera signal processing unit 104 and a VF signal processing unit 105. The camera CPU 101 controls the operations of the respective units in the camera apparatus 100. The camera CPU 101 establishes a necessary signal communication with the lens CPU 201 of the lens apparatus 200 and the CPU 501 of the CCU 500. The user operation unit 102 is connected to the camera CPU 101 and configures a user interface for a variety of operations by a user.

The sensor unit 103 includes a high-definition (high-resolution) image sensor such as 4K or 8K and outputs a high-definition captured image signal corresponding to a subject. The above-described lens apparatus 200 forms an image of the subject on an image capturing surface of the image sensor. The camera signal processing unit 104 processes the captured image signal outputted from the sensor unit 103 and outputs an image signal (camera video signal) as an output from the camera apparatus 100. The camera signal processing unit 104 performs processing including a gain control, a white balance adjustment and a gamma correction.

The VF signal processing unit 105 generates an image signal having an HD resolution for the view finder based on the image signal outputted from the camera signal processing unit 104 and transmits the image signal to the view finder 300. The VF signal processing unit 105 generates a display signal such as a display 301 showing a status of the addition amount in the focus adjustment value generated in the camera CPU 101 based on a display control signal transmitted from the camera CPU 101, for example. Then, the VF signal processing unit 105 synthesizes the display signal to the image signal (captured image signal) outputted from the camera signal processing unit 104 and generates an image signal for the view finder.

For example, the status of the addition amount shows that the addition amount has a "positive value" or a "negative value". In FIG. 1, as an arrow from a base line (horizontal line) faces downward, it shows that the addition amount has the "negative value". A length of the arrow shows a magnitude of the addition amount. In this case, when the addition amount is zero, only the base line (horizontal line) is displayed and no arrow is displayed.

The CCU 500 includes the CPU 501, a user operation unit 502 and a video processing unit 503. The CPU 501 controls the operation of the respective units of the CCU 500. The CPU 501 establishes a necessary signal communication with the camera CPU 101 of the camera apparatus 100. The user operation unit 502 is connected to the CPU 501 and configures the user interface for a variety of the operations by the user.

The video processing unit 503 processes a high-definition image signal such as 4K or 8K transmitted through the cable 600 from the camera apparatus 100 and outputs a high-definition image signal after processing.

A content of the high-definition image signal can be identified on a large size monitor 510 corresponding to the high-definition image signal, for example.

Also, the follow focus controller 800 is connected to the CPU 501 via a cable 801. When the user operates the follow focus controller 800, the addition amount can be adjusted to the focus distance adjusted with the focus demand 400. In this case, the user can adjust the addition amount in both positive and negative directions. The adjustment signal of the addition amount is provided from the CPU 501 to the camera CPU 101 of the camera apparatus 100.

[Specific Generation Embodiment of Focus Adjustment Value]

Next, a specific generating embodiment of a focus adjustment value in the camera CPU 101 will be described referring to FIGS. 2 and 3. In FIGS. 2 and 3, a "D-FP" represents the focus adjustment value (focus distance) adjusted with the focus demand 400, a "F-FP" represents the addition amount by the follow focus controller 800, and "R-FP" represents the focus adjustment value (actual focus adjustment value) generated in the camera CPU 101.

This embodiment shows that an absolute value of the addition amount adjusted with the follow focus controller 800 is reduced by ⅓ of an absolute value of a variable amount of the focus adjustment value adjusted with the focus demand 400. In this embodiment, a ratio of "1/3" is used. Other ratios can be used although the detailed description is omitted.

The focus adjustment values are generated as shown in FIGS. 2. As shown in FIG. 2A, it is assumed that the focus adjustment value "D-FP" adjusted with the focus demand 400 by a camera operator is "53". At this time, the camera CPU 101 set the focus adjustment value "R-FP" to "53". Here, it is assumed that the range of the focus adjustment value is 0 to 99.

Figure 2A:
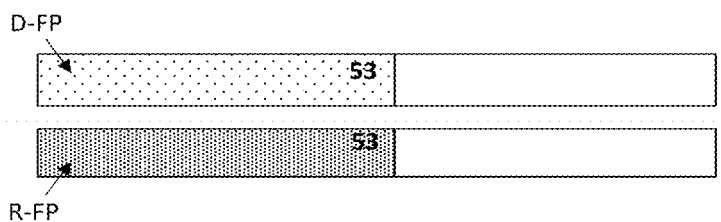
FIGS. 2A, 2B, 2C and 2D each is a diagram for illustrating a specific generating embodiment of a focus adjustment value in a camera CPU.
Figure 2B:
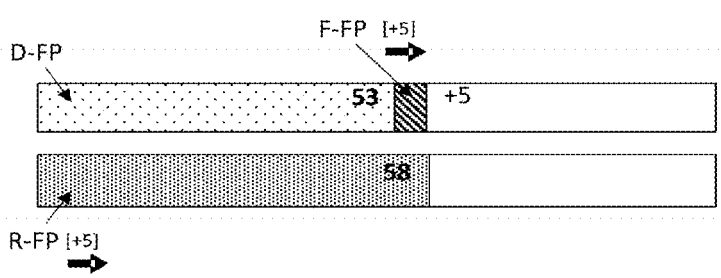

The focus adjustment value "R-FP" of "53" is not in a status that a target subject is in focus. As shown in FIG. 2B, it is assumed that a follow focus operator finely adjusts the focus by the follow focus controller 800 and the addition amount "F-FP" is "+5". At this time, while the focus adjustment value "D-FP" adjusted with the focus demand 400 is still "53", the camera CPU 101 sets the focus adjustment value "R-FP" to "58" by adding "+5".

Figure 2C:
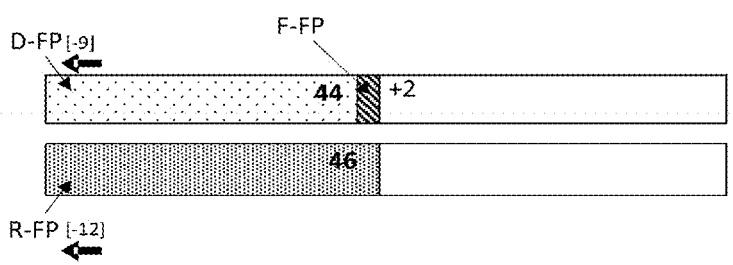

From this point, the camera operation pans to adjust the focus by the focus demand 400 to match an image capturing position. As shown in FIG. 2C, when the focus adjustment value "D-FP" is "44", the camera CPU 101 reduces the absolute value of the addition amount "F-FP" by "3" that is ⅓ of the absolute value of the variable amount of the focus adjustment value "9" and sets the addition amount "F-FP" to "+2" and the focus adjustment value "R-FP" to "46". Accordingly, the change amount of the focus adjustment value "R-FP" in this case will be "−12".

Figure 2D:
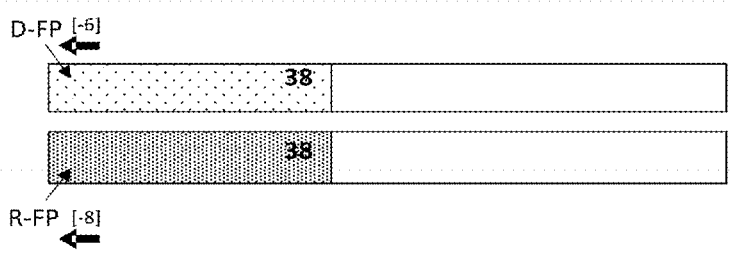

From this point, the camera operation pans again to adjust the focus by the focus demand 400 to match an image capturing position. As shown in FIG. 2D, when the focus adjustment value "D-FP" is "38", the camera CPU 101 reduces the absolute value of the addition amount "F-FP" by "2" that is ⅓ of the absolute value of the variable amount of the focus adjustment value "6" and sets the addition amount "F-FP" to "0" and the focus adjustment value "R-FP" to "38". Accordingly, the change amount of the focus adjustment value "R-FP" in this case will be "−8".

Next, the focus adjustment values are generated as shown in FIGS. 3. As shown in FIG. 3A, it is assumed that the focus adjustment value "D-FP" adjusted with the focus demand 400 by a camera operator is "53". At this time, the camera CPU 101 set the focus adjustment value "R-FP" to "53". Here, it is assumed that the range of the focus adjustment value is 0 to 99.

Figure 3A:
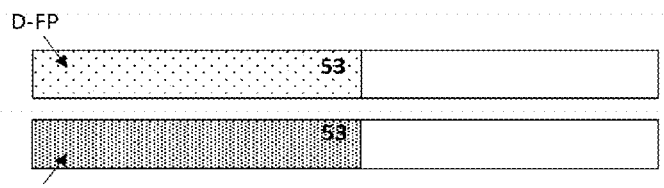
FIGS. 3A, 3B, 3C and 3D each is a diagram for illustrating a specific generating embodiment of a focus adjustment value in a camera CPU.
Figure 3B:
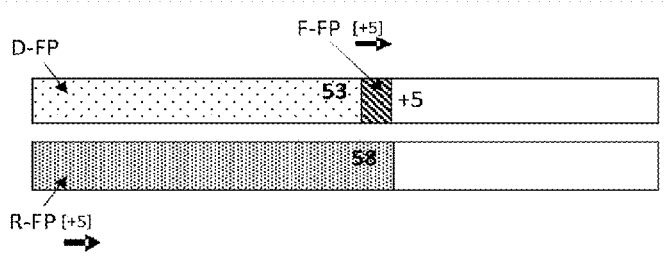

The focus adjustment value "R-FP" of "53" is not in a status that a target subject is in focus. As shown in FIG. 3B, it is assumed that a follow focus operator finely adjusts the focus by the follow focus controller 800 and the addition amount "F-FP" is "+5". At this time, while the focus adjustment value "D-FP" adjusted with the focus demand 400 is still "53", the camera CPU 101 sets the focus adjustment value "R-FP" to "58" by adding "+5".

Figure 3C:
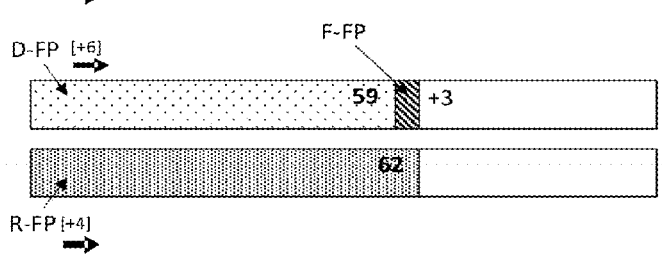

From this point, the camera operation pans to adjust the focus by the focus demand 400 to match an image capturing position. As shown in FIG. 3C, when the focus adjustment value "D-FP" is "59", the camera CPU 101 reduces the absolute value of the addition amount "F-FP" by "2" that is ⅓ of the absolute value of the variable amount of the focus adjustment value "6" and sets the addition amount "F-FP" to "+3" and the focus adjustment value "R-FP" to "62". Accordingly, the change amount of the focus adjustment value "R-FP" in this case will be "+4".

Figure 3D:
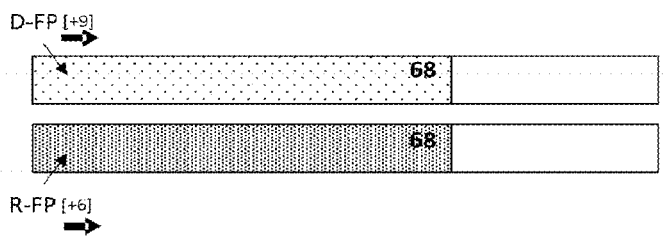

From this point, the camera operation pans again to adjust the focus by the focus demand 400 to match an image capturing position. As shown in FIG. 3D, when the focus adjustment value "D-FP" is "68", the camera CPU 101 reduces the absolute value of the addition amount "F-FP" by "3" that is ⅓ of the absolute value of the variable amount of the focus adjustment value "9" and sets the addition amount "F-FP" to "0" and the focus adjustment value "R-FP" to "68". Accordingly, the change amount of the focus adjustment value "R-FP" in this case will be "+6".

Although not described above, it is contemplated that the value of the focus adjustment value "D-FP" added to the addition amount "F-FP" exceeds the range of the focus adjustment value, e.g., 0 to 99 depending on the focus adjustment value "D-FP" adjusted with the focus demand 400 or the addition amount "F-FP" adjusted with the follow focus controller 800. In this case, the camera CPU 101 generates the focus adjustment values by reducing the absolute value of the addition amount "F-FP" such that an actual focus adjustment value "R-FP" does not exceed the range of the focus adjustment value.

Also, although not described above, a magnitude (maximum amplitude) of the addition amount "F-FP" adjusted with the follow focus controller 800 may be set. In this case, the addition amount "F-FP" can be limited and the focus adjustment by the follow focus controller 800 can be limited to a fine adjustment.

As described above, in the camera system 10 shown in FIG. 1, the focus control is performed based on the focus adjustment value adjusted with the focus demand 400 and the addition amount adjusted with the follow focus controller 800. Therefore, a focus status adjusted with the focus demand 400 can be finely adjusted with the follow focus controller 800.

In addition, in the camera system 10 shown in FIG. 1, the camera CPU 101 uses the absolute value of the addition amount adjusted with the follow focus controller 800 by reducing the absolute value of the addition amount depending on a change amount of the focus distance adjusted with the focus demand 400. Accordingly, when a status of capturing an image is changed once the camera operator pans and the focus distance adjusted with the focus demand 400 is greatly changed, the absolute value of the addition amount adjusted with the follow focus controller 800 will be automatically reduced. Therefore, it is possible to automatically lessen the effect of the addition amount that is not or less related to the status of capturing the image after change.

In the camera system 10 shown in FIG. 1, the VF signal processing unit 105 generates a display signal such as a display 301 showing the status of the addition amount in the focus adjustment value generated in the camera CPU 101, synthesizes the display signal to the image signal (captured image signal) outputted from the camera signal processing unit 104 and generates an image signal for the view finder. Therefore, the camera operator can easily know the current status of the addition amount, for example.

<2. Second Embodiment>
[Configuration Embodiment of Camera System]

Figure 4:
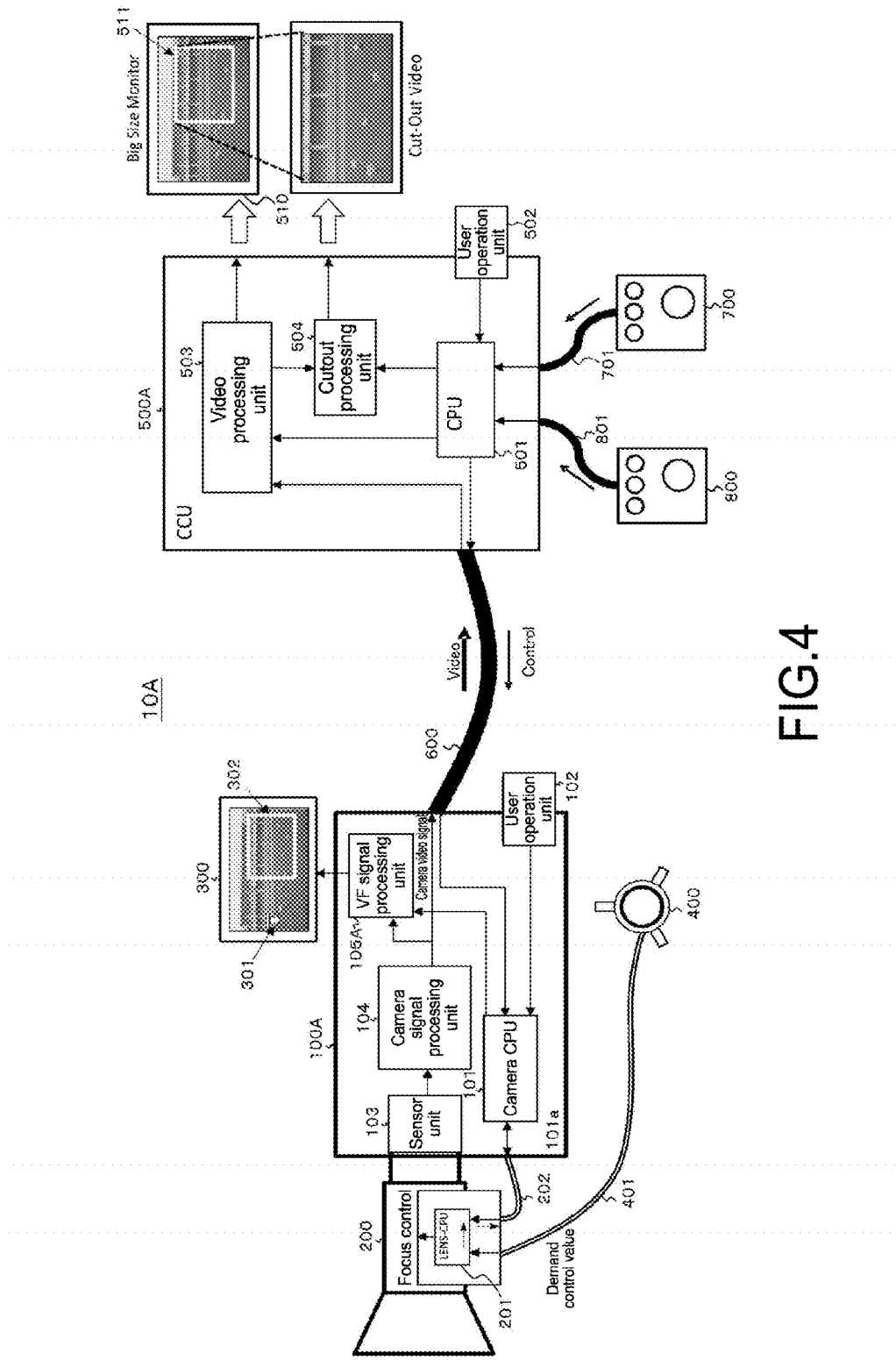
FIG. 4 is a block diagram showing a configuration embodiment of a camera system according to a second embodiment of the present technology.

FIG. 4 shows a configuration embodiment of a camera system 10A according to a second embodiment of the present technology. The camera system 10A includes a camera apparatus 100A and a camera control unit (CCU) 500A connected to the camera apparatus 100A via a cable 600. In FIG. 4, the components already described are denoted by the same reference numerals, and thus detailed description thereof will be hereinafter omitted.

To the camera apparatus 100A, the lens apparatus 200 and the view finder 300 are connected. The camera apparatus 100A includes the camera CPU 101, the user operation unit 102, the sensor unit 103, the camera signal processing unit 104 and the VF signal processing unit 105. The VF signal processing unit 105A generates an image signal having an HD resolution for the view finder based on the image signal outputted from the camera signal processing unit 104 and transmits the image signal to the view finder 300.

The VF signal processing unit 105A generates a display signal such as a display 301 showing a status of the addition amount in the focus adjustment value generated in the camera CPU 101 based on a display control signal transmitted from the camera CPU 101 and a rectangular frame display 302 showing a cutout position (area) in the CCU 500A. The rectangular frame display 302 shows a screen area where the addition amount is adjusted with the follow focus controller 800, as described later.

The CCU 500A includes the CPU 501, the user operation unit 502, the video processing unit 503, and a cutout processing unit 504. The cutout processing unit 504 takes out and outputs an image signal having an HD resolution at the cutout position (area) from a high-definition image signal provided by the video processing unit 503. The cutout position (area) is acknowledged through a cable 701 from a cutout controller 700 by the CPU 501.

A user can change the cutout position (area) to any position by operating the cutout controller 700. A large size monitor 510 displays a content of the high-definition image signal provided by the video processing unit 503. The image is subjected to a rectangular frame display 511 showing the cutout position (area). The user can refer the rectangular frame display 511 and move the cutout position (area) to an appropriate position.

To the CPU 501, the follow focus controller 800 is connected via the cable 801. The user operates the follow focus controller 800 to adjust the addition amount of the focus distance adjusted with the focus demand 400 and performs the focus adjustment (fine adjustment) of the cutout position (area). In this case, the user can adjust the addition amount in both positive and negative directions. The adjustment signal of the addition amount is provided to the camera CPU 101 of the camera apparatus 100.

Although no description is provided in detail, others of the camera system 10A shown in FIG. 4 are configured as those of the camera system 10 shown in FIG. 1. The camera system 10A shown in FIG. 4 can provide the function effects similar to those of the camera system 10 shown in FIG. 1.

In addition, in the camera system 10A shown in FIG. 4, the VF signal processing unit 105A generates a display signal such as the rectangular frame display 302 showing a focus adjustment position (the cutout position (area)) in the follow focus controller 800, synthesizes the display signal to the image signal (captured image signal) outputted from the camera signal processing unit 104 and generates an image signal for the view finder.

Therefore, the camera operator can easily know the focus adjustment position in the follow focus controller 800. Accordingly, a focusing area can be shared by the camera operator and a director.

<3. Alternative Embodiment>

In the above-described embodiments, the focus distance adjusted with the focus demand 400 connected to the lens apparatus 200 is finely adjusted with the follow focus controller 800 connected to the CCU 500, 500A. However, it should be appreciated that the present technology is not limited to and the present technology can be applied to the configuration that the focus distance adjusted with a first adjustment unit can be finely adjusted with a second adjustment unit.

The present technology may have the following configurations.

(1) A focus control apparatus, including:
a first adjustment unit configured to adjust a focus distance;
a second adjustment unit configured to adjust an addition amount of the focus distance adjusted with the first adjustment unit; and
a focus control unit configured to control a focus based on the focus distance adjusted with the first adjustment unit and the addition amount adjusted with the second adjustment unit.

(2) The focus control apparatus according to (1) above, in which
the focus control unit uses an absolute value of the addition amount adjusted with the second adjustment unit by reducing the absolute value of the addition amount depending on a change amount of the focus distance adjusted with the first adjustment unit.

(3) The focus control apparatus according to (1) or (2) above, further including:
a display control unit configured to display a status of the addition amount used in the focus control unit.

(4) The focus control apparatus according to any one of (1) to (3) above, in which
the first adjustment unit is a focus demand connected to the lens apparatus, and the second adjustment unit is a follow focus controller connected to a camera control unit.

(5) The focus control apparatus according to (4) above, further including:

a display control unit configured to display a screen area where the addition amount is adjusted with the follow focus controller on a view finder based on screen area information transmitted from the camera control unit.

(6) The focus control apparatus according to (5) above, in which the camera control unit has a cutout function, and the screen area where the addition amount is adjusted is a cutout area.

(7) A method of controlling a focus, including:

adjusting a focus distance as a first adjustment step;

adjusting an addition amount of the focus distance adjusted with the first adjustment step as a second adjustment step; and controlling a focus based on the focus distance adjusted with the first adjustment step and the addition amount adjusted with the second adjustment step.

(8) A camera apparatus, including:

a focus adjustment value generation unit configured to generate a focus adjustment value from a focus distance adjusted with a first adjustment unit and an addition amount adjusted with a second adjustment unit to the focus distance adjusted with the first adjustment unit; and a focus control unit configured to control a focus based on the focus adjustment value generated in the focus adjustment value generation unit.

(9) The camera apparatus according to (8) above, in which the focus adjustment value generation unit uses an absolute value of the addition amount adjusted with the second adjustment unit by reducing the absolute value of the addition amount depending on a change amount of the focus distance adjusted with the first adjustment unit.

(10) The camera apparatus according to (9) above, further including:

a display control unit configured to display a status of the addition amount in the focus adjustment value generated in the focus adjustment value generation unit.

(11) The camera apparatus according to (9) or (10) above, in which the first adjustment unit is a focus demand connected to the lens apparatus, and the second adjustment unit is a follow focus controller connected to a camera control unit.

(12) The camera apparatus according to any one of (9) to (11) above, further including:

a display control unit configured to display a screen area where the addition amount is adjusted with the follow focus controller on a view finder based on screen area information transmitted from the camera control unit.

(13) A method of controlling a focus in a camera apparatus, including:

generating a focus adjustment value from a focus distance adjusted with a first adjustment unit and an addition amount adjusted with a second adjustment unit to the focus distance adjusted with the first adjustment unit; and controlling the focus by a focus control unit based on the focus adjustment value generated in the focus adjustment value generation.

It should be understood by those skilled in the art that various modifications, combinations, sub-combinations and alterations may occur depending on design requirements and other factors insofar as they are within the scope of the appended claims or the equivalents thereof.

What is claimed is:

1. A focus control apparatus, comprising:

a camera signal processing circuit configured to receive an image signal from an image sensor;

a first display control circuit configured to receive a video signal from the camera signal processing circuit and generate a first display video signal;

a camera control circuit including a second display control circuit that is configured to receive the video signal and generate a second display video signal;

a focus demand control circuit configured to generate a first focus control input according to a first user input by a first user and according to the first display video signal;

a follow focus control circuit configured to generate a second focus control input according to a second user input by a second user and according to the second display video signal; and a focus control circuit configured to adjust a focus distance according to the first focus control input and then to further adjust the focus distance according to a user adjustment input by the first user, wherein the first display control circuit is configured to control display of an addition amount that represents the second focus control input, and the first user inputs the user adjustment based on the display of the addition amount.

2. The focus control apparatus according to claim 1, wherein the focus control circuit uses an absolute value of the addition amount by reducing the absolute value of the addition amount according to a change amount of the adjusted focus distance.

3. A lens apparatus, comprising:

the focus control apparatus according to claim 1; and a lens, wherein the focus control circuit is configured to adjust a focus of the lens.

4. The lens apparatus according to claim 3, wherein the focus control circuit uses an absolute value of the addition amount by reducing the absolute value of the addition amount according to a change amount of the adjusted focus distance.

5. A camera apparatus, comprising:

the image sensor;

a display; and the focus control apparatus according to claim 1, wherein the first display control circuit is configured to control the display to display a screen area where the addition amount is adjusted with the follow focus controller on a view finder based on screen area information transmitted from the camera control circuit.

6. The camera apparatus according to claim 5, wherein the camera control circuit has a cutout function, and the screen area where the addition amount is adjusted is a cutout area.

7. A focus control apparatus, comprising:

a camera including an image sensor;

a camera signal processing circuit configure to generate a video signal;

a cable that connects the camera with a camera control circuit, the cable configured to transmit the video signal from the camera to the camera control circuit;

a focus demand control circuit configured to generate a first focus control input;

a follow focus control circuit configured to generate a second focus control input;

a focus control circuit configured to adjust a focus distance according to the first focus control input and then to further adjust the focus distance according to a user adjustment input by a first user; and a display control circuit configured to control display an addition amount that represents the second focus control input transmitted via the cable from the camera control circuit to the camera, wherein the first user inputs the user adjustment based on the display of the addition amount.

8. The focus control apparatus according to claim 7, wherein the focus control circuit uses an absolute value of the addition amount by reducing the absolute value of the addition amount according to a change amount of the adjusted focus distance.

9. A lens apparatus, comprising:

the focus control apparatus according to claim 7; and a lens, wherein the focus control circuit is configured to adjust a focus of the lens.

10. The lens apparatus according to claim 9, wherein the focus control circuit uses an absolute value of the addition amount by reducing the absolute value of the addition amount according to a change amount of the adjusted focus distance.

11. A camera apparatus, comprising:

a display; and the focus control apparatus according to claim 7, wherein the display control circuit is configured to control the display to display a screen area where the addition amount is adjusted with the follow focus controller on a view finder based on screen area information transmitted from the camera control circuit.

12. The camera apparatus according to claim 11, wherein the camera control circuit has a cutout function, and the screen area where the addition amount is adjusted is a cutout area.

13. A focus control apparatus, comprising:

processing circuitry configured to receive an image signal from an image sensor;

generate a first display video signal according to the image signal;

generate a second display video signal according to the first display video signal;

generate a first focus control input according to first user input by a first user and according to the first display video signal;

generate a second focus control input according to a second user input by a second user and according to the second display video signal;

adjust a focus distance according to the first focus control input;

further adjust the focus distance according to a user adjustment input by the first user; and control display of an addition amount that represents the second focus control input, wherein the first user inputs the user adjustment based on the display of the addition amount.

14. The focus control apparatus according to claim 13, wherein the processing circuitry uses an absolute value of the addition amount by reducing the absolute value of the addition amount according to a change amount of the adjusted focus distance.

15. A lens apparatus, comprising:

the focus control apparatus according to claim 13; and a lens, wherein the processing circuitry is configured to adjust a focus of the lens.

16. The lens apparatus according to claim 15, wherein the processing circuitry uses an absolute value of the addition amount by reducing the absolute value of the addition amount according to a change amount of the adjusted focus distance.

17. A camera apparatus, comprising:

the image sensor;

a display; and the focus control apparatus according to claim 13, wherein the processing circuitry is configured to control the display to display a screen area where the addition amount is adjusted with the follow focus controller on a view finder based on screen area information.

* * * * *